(12) United States Patent
Sytema et al.

(10) Patent No.: US 11,148,849 B2
(45) Date of Patent: Oct. 19, 2021

(54) CARDBOARD BLANK FOR A BOX, METHOD AND SYSTEM FOR CREATING A CUSTOM-SIZED CARDBOARD BLANK FOR A BOX, AND METHOD AND SYSTEM FOR PACKAGING SHIPMENT SETS IN A BOX

(71) Applicant: QUADIENT TECHNOLOGIES FRANCE, Bagneux (FR)

(72) Inventors: Herman Sytema, Drachten (NL); Joost Kosse, Drachten (NL); Hayo Vaatstra, Drachten (NL); Lennart Berghuis, Drachten (NL)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 0 days.

(21) Appl. No.: 16/966,742

(22) PCT Filed: Jan. 31, 2019

(86) PCT No.: PCT/EP2019/052446
§ 371 (c)(1),
(2) Date: Jul. 31, 2020

(87) PCT Pub. No.: WO2019/149858
PCT Pub. Date: Aug. 8, 2019

(65) Prior Publication Data
US 2020/0361654 A1 Nov. 19, 2020

(30) Foreign Application Priority Data

Jan. 31, 2018 (DE) ..................... 10 2018 102 193.3

(51) Int. Cl.
*B65D 5/20* (2006.01)
*B65D 5/24* (2006.01)
(Continued)

(52) U.S. Cl.
CPC ........... *B65D 5/2052* (2013.01); *B65D 5/241* (2013.01); *B65D 5/3678* (2013.01); *B65D 5/18* (2013.01)

(58) Field of Classification Search
CPC .... B65D 5/2052; B65D 5/241; B65D 5/3678; B65D 5/18; B65D 5/244; B65D 5/242; B65D 5/3657
(Continued)

(56) References Cited

U.S. PATENT DOCUMENTS 4,338,808 A * 7/1982 Weiss ................. B21D 5/16
248/48.2
6,520,404 B1 * 2/2003 Waldburger ........... B65D 5/064
229/137

(Continued)

FOREIGN PATENT DOCUMENTS

DE 4018140 C1 9/1991
EP 3147838 A1 3/2017
(Continued)

OTHER PUBLICATIONS

International Search Report and Written Opinion for PCT/EP2019/052446, dated Mar. 14, 2019, 12 pages.

*Primary Examiner* — Christopher R Demeree
(74) *Attorney, Agent, or Firm* — Cozen O'Connor (57) ABSTRACT

A cardboard blank for folding a box has a length and a width, wherein in the length direction five adjacent sections of panels are present, each panel of the first, third and fifth section having a length ($H_B$) corresponding to the height of the box to be folded, and each panel of the second and forth section having a length ($L_B$) corresponding to the length of the box to be folded, in the width direction (W) three adjacent rows of panels are present, each panel of the second row having a width ($W_B$) corresponding to the width of the box to be folded, and each panel of the first and the third row (Continued)

having a width ($H_B$) corresponding to the height of the box to be folded, between adjacent panels in the length direction (L) crease lines are provided, between panels of the second, the third and the forth section which are adjacent to each other in the width direction (W), crease lines are provided, adjacent panels of the first section are separated from each other by incisions, in the fifth section only a panel in the second row is present, between the panels of the second and the forth section in the first and the third row, a respective joint panel is provided, each of which being divided in triangular sections by crease lines between diagonally opposing corners of the each joint panel, the outer triangle being cut away.

16 Claims, 5 Drawing Sheets

(51) Int. Cl.
*B65D 5/36* (2006.01)
*B65D 5/18* (2006.01)

(58) Field of Classification Search
USPC ............ 229/117.01, 144, 137, 132, 186, 918
See application file for complete search history.

(56) References Cited

U.S. PATENT DOCUMENTS

| | | | |
|---|---|---|---|
| 8,136,717 B2 * | 3/2012 | De Paula | B65D 5/40 229/101 |
| 8,474,688 B2 * | 7/2013 | Cameron | B65D 5/16 229/240 |
| 10,625,898 B2 * | 4/2020 | Hodge | B65D 5/4266 |
| 10,745,187 B1 * | 8/2020 | Vincent | B65D 81/3858 |

FOREIGN PATENT DOCUMENTS

| | | |
|---|---|---|
| FR | 2987824 A1 | 9/2013 |
| GB | 215901 A1 | 5/1924 |
| GB | 2167043 A | 5/1986 |
| WO | 2013117852 A1 | 8/2013 |
| WO | 2014117817 A1 | 8/2014 |
| WO | 2016059218 A1 | 4/2016 |

* cited by examiner

CARDBOARD BLANK FOR A BOX, METHOD AND SYSTEM FOR CREATING A CUSTOM-SIZED CARDBOARD BLANK FOR A BOX, AND METHOD AND SYSTEM FOR PACKAGING SHIPMENT SETS IN A BOX

TECHNICAL FIELD OF THE INVENTION

The invention relates to a cardboard blank for a box, a method and a system for creating a custom-sized cardboard blank for a box and a method and a system for packaging shipment sets in a box. More particularly, the invention relates to automating the packaging of varying shipment sets, i.e. sets, in which at least the number, usually the number and the size of the items vary.

BACKGROUND OF THE INVENTION

Mail ordering has become a widely used way of buying goods. More and more companies offer virtual department stores, in which the customers can electronically put goods in a shopping cart that later will be transferred by the respective company into a dispatch order so that in a warehouse a shipment set comprising one or more items that have been ordered (and sometimes additional items such as samples, vouchers, invoices, etc.) can be assembled based on the respective dispatch order.

While assembling a shipment set in a warehouse of a specialized distributor is nowadays often done more or less fully automated, packaging the items to be shipped is still a challenge, in particular when a shipment set comprises several items of different sizes and in different quantity. Often, the items to be packaged are provided automatically to a person packaging the items manually. Depending on the size and number of the items, the person selects a suitable box size. Generally the box is a cardboard box that upon packaging is assembled from a corresponding cardboard blank.

To automate the packaging process even in cases where the items vary in size and number, a system has been proposed in WO 2014/117817 A1 that allows—within the boundaries imposed by the material used—creating a fully custom-sized box, i.e. a box, of which width, length and height are adapted to the respective content of the box. The box is created from a roll or a stack of cardboard by cutting out and creasing a custom-sized blank from which the box including panels to form a lid is folded automatically around the item(s) to be packaged after placing the item(s) on the blank.

WO 2016/059218 A1 discloses a system and a method for automatically packaging items varying in size and number applying two separate packings, namely an inner packing surrounding the items to be packaged in a first direction, and an outer packing surrounding the inner packing in a second direction, said second direction being substantially perpendicular to the first direction such that the inner and the outer packing form a combined package enclosing the package items from all sides.

WO 2013/117852 A1 discloses a system and a method for reducing the height of a cardboard box to the apex of the highest item in the box. WO 2013/117852 A1 discloses prefolded boxes, of which also only one dimension, namely the height, can be adapted to the actual content of the box. However, if only one dimension of a box can be adapted, the finished package will often not be optimal with respect to volume, while transportation costs often depend not only on the weight, but also on the volume of a package.

FR 2 987 824 A1 discloses blanks for manually folding boxes and corresponding lids, wherein each blank comprises numerous perforated lines/indentations and incisions to facilitate folding a box and a corresponding lid having different dimensions. As a broad variety of possible boxes and lids can be formed with the blanks according to FR 2 987 824 A1, different sections formed by the perforated lines and incisions are coloured differently to allow the user to identify, which sections have to be folded in order to create a box or a lid of a certain size. Due to the high number of perforated lines and cuts, the stability of a corresponding box and a lid is not optimal. Moreover, producing such coloured blanks with numerous perforated lines and cuts is complex and hence expensive. A very similar approach is made in GB 2 167 043 A, in which the panels forming the bottom, the sides and the top of a box are also provided with multiple crease lines and incisions allowing to fold the respective panels at different locations.

While the known systems and methods for automating the packaging process work well for a number of applications, and in particular the system disclosed in WO 2014/117817 A1 has proven to allow packaging items varying in size and number fully automatically, it has turned out that there is a need for optimization of the packaging process under a number of aspects. For example, when items of different sizes, odd shapes etc. shall be packaged by placing them on the area of a cardboard blank that forms a so-called bottom panel of a box to be created from the blank by folding respective other areas of the blank that form side, corner and top panels around the arrangement of items, it is difficult to arrange the items such that they stay in place in relation to each other while being transported and when the panels are erected around the items. Also, it is difficult to create an arrangement, in which items other than substantially cuboid items like books are stacked on top of each other, which in certain cases would however be advantageous in order to minimize the volume of the box created.

Another problem with the known systems is that the blank itself typically has a rather complex structure and accordingly, the structure necessary for automatically cutting, creasing and folding is complex and expensive so that it is generally only used by distributors having a high daily output of packages.

DISCLOSURE OF THE INVENTION

It is an object of the invention to provide an improved cardboard blank for a custom-sized box, i.e. a box, of which length, width and height are adapted to specific needs, an improved method and an improved system for creating a custom-sized cardboard blank for a box respectively for automatically packaging a shipment set in a box.

The object is achieved by a cardboard blank according to claim 1 respectively claim 2, a method respectively a system for creating a custom-sized cardboard blank according to claim 6 respectively claim 8, and a method respectively a system for packaging a shipment set in a box according to claim 9 respectively claim 10. The respective dependent claims relate to advantageous specific embodiments of the invention.

In one embodiment, the cardboard blank for folding a box comprises incisions and crease lines dividing the blank having a length and a width into three adjacent rows of panels, namely a first row comprising a first corner panel, a first left side panel, a first joint panel, and a first right side panel, a second row adjacent to the first row, comprising a first top panel, a left main panel, a bottom panel, a right main panel and a second top panel, and a third row adjacent to the second row, comprising a second corner panel, a second left side panel, a second joint panel and a second right side panel, the first and the second corner panel being separated from the first respectively the second left side panels via a respective crease line, the first and the second left side panel being separated from the first respectively the second joint panel via a respective crease line, the first and the second joint panel being separated from the first respectively the second right side panel via a respective crease line, the first top panel being separated from the left main panel, the left main panel being separated from the bottom panel, the bottom panel being separated from the right main panel and the right main panel being separated from the second top panel via a respective crease line, the first and the second left side panel being separated from the left main panel via a respective crease line, the first and the second right side panel being separated from the right main panel via a respective crease line, the first and the second joint panel being separated from the bottom panel via a respective crease line, the first and the second corner panels being separated from the first top panel via a respective incision, the first joint panel comprising three triangular sections defined by the crease lines between the respective side panels adjacent to the first joint panel, the crease line between the bottom panel and the first joint panel, a first diagonal crease line running from the common corner of the first left side panel, the left main panel and the bottom panel in the direction of the diagonally opposed common corner of first right side panel and the first joint panel, a second diagonal crease line running from the common corner of the first right side panel, the right main panel and the bottom panel in the direction of the diagonally opposed common corner of the first left side panel and the first joint panel, and two free edges running from the point where the first and the second diagonal crease lines meet towards the common corner of the first left side panel and the first joint panel respectively towards the common corner of the first right side panel and the first joint panel, the second joint panel comprising three triangular sections defined by the crease lines between the respective side panels adjacent to the second joint panel, the crease line between the bottom panel and the second joint panel, a third diagonal crease line running from the common corner of the second left side panel, the left main panel and the bottom panel in the direction of the diagonally opposed common corner of second right side panel and the second joint panel, a fourth diagonal crease line running from the common corner of the second right side panel, the right main panel and the bottom panel in the direction of the diagonally opposed common corner of the second left side panel and the second joint panel, and two free edges running from the point where the third and the fourth diagonal crease lines meet towards the common corner of the second left side panel and the second joint panel respectively towards the common corner of the second right side panel and the second joint panel.

According to another embodiment, a cardboard blank for folding a box comprises incisions and crease lines dividing the blank having a length and a width into panels, wherein in the length direction five adjacent sections of panels are present, each panel of the first, third and fifth section having a length corresponding to the height of the box to be folded, and each panel of the second and forth section having a length corresponding to the length of the box to be folded, in the width direction three adjacent rows of panels are present, each panel of the second row having a width corresponding to the width of the box to be folded, and each panel of the first and the third row having a width corresponding to the height of the box to be folded, between adjacent panels in the length direction crease lines are provided, between panels of the second, the third and the forth section, which are adjacent to each other in the width direction, crease lines are provided, adjacent panels of the first section are separated from each other by incisions, in the fifth section only a panel in the second row is present, between the panels of the second and the forth section in the first and the third row, a respective joint panel is provided, each of which being divided in triangular sections by crease lines between diagonally opposing corners of each joint panel, the outer triangle being cut away.

The blank layout of both embodiments can be very easily erected with simple actions without having to bond any of the panels together. The blank layout is straightforward and can be easily created for different dimensions from cardboard supplied to a respective system comprising structure for cutting and creasing the cardboard to have the aforementioned layout. The cardboard can be supplied in form of single sheets or for example from a stack or a roll of cardboard. One huge advantage of the blank layout according to the invention is the stability of a box folded from a respective blank, allowing it to use not only so-called double-faced cardboard, which is at present the standard for folding packaging boxes for shipment, i.e. cardboard, in which a corrugated layer is sandwiched between two flat layers and which as such has a high stiffness, but to use much more flexible and cheaper materials such as plain cardboard or so-called single-faced corrugated cardboard, in which a corrugated layer is attached to a flat layer and which can easily be stored on a roll of cardboard. Single-faced corrugated cardboard has a tendency to roll and is generally not suitable for making stable packaging boxes. The specific way, in which the invention ensures that even with material such as single-faced corrugated cardboard stable boxes can be folded, will become apparent from the detailed description.

According to the invention, the box is not erected around a shipment set, but is created for a specific shipment set once the dimensions of a box needed for the shipment set have been determined, which determination can be done in multiple ways. The box has a substantial cuboid shape as known boxes for packaging shipment, and is, once created, presented to a human or a machine with one side of the box left open so that the item or the items forming a shipment set can be directly filled into the box. Depending on the nature of the items, it is possible to completely avoid or at least reduce fill material like expanded polystyrene peanuts. As the items of a shipment set (if the shipment set comprises more than one item) are packaged directly in the box, no commitments have to be made regarding stability of the arrangement since the box holds the items such that items can be placed on top of each other as may be necessary in order to achieve an optimal or almost optimal arrangement with a minimized total volume of the box. Typically, postage costs are not only based on the weight but also on the volume of the box to be shipped so that custom-sizing the boxes and optimizing the volume also reduces the shipment costs. Besides, reducing the volume of the box also reduces the material needed for the box, which is advantageous under environmental aspects.

Another advantage of a box folded from a blank according to the invention is that it is esthetically attractive since on the respective panels forming the outer sides of the box no seams are present, which also allows to close the box easily for example with one or two strips of self-adhesive tape.

Further details and advantages of the invention will become apparent from the following non-limiting description of preferred embodiments in conjunction with the drawing, which comprises eight figures.

DESCRIPTION OF PREFERRED EMBODIMENTS

Figure 1A:
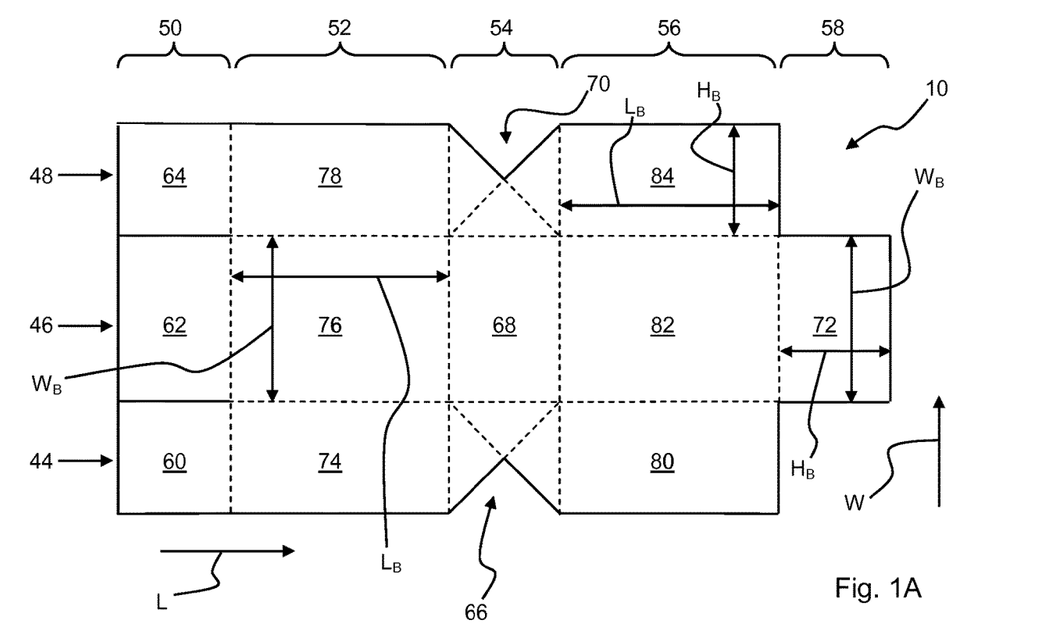
FIGS. 1A and 1B are top views onto a custom-sized cardboard blank according to the invention in the unfolded state.
Figure 1B:
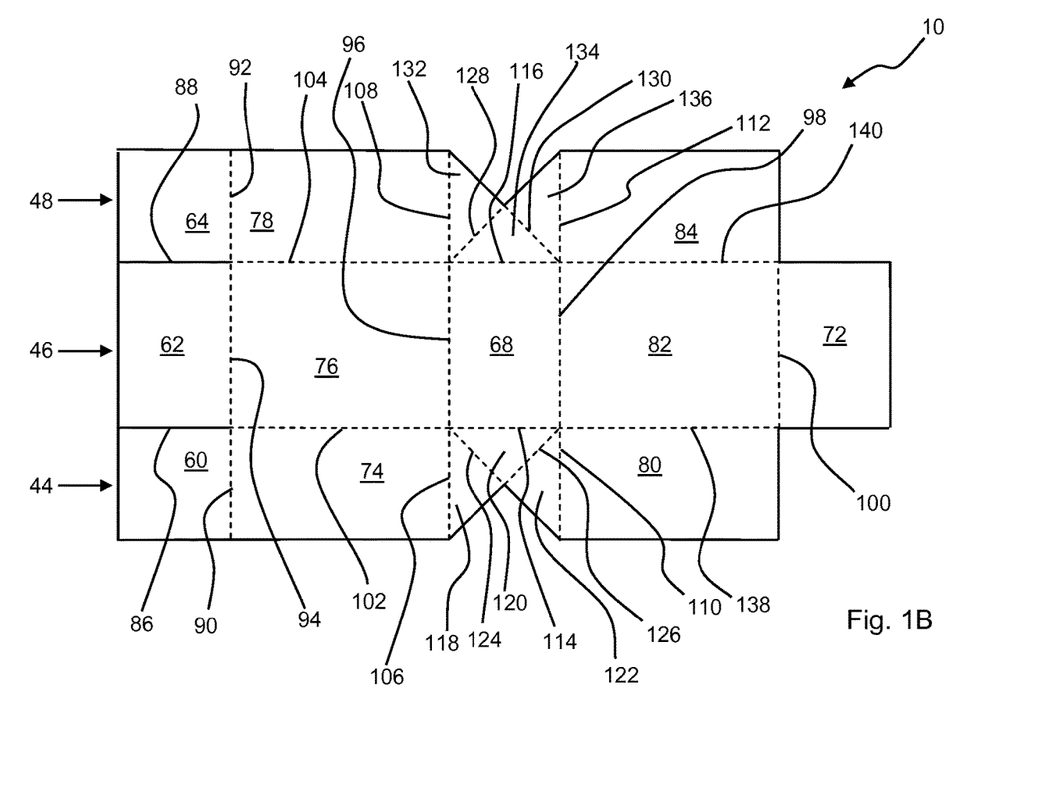

In FIGS. 1A and 1B a custom-sized cardboard blank 10 according to the invention is shown. In order not to overload the figures with reference lines and numbers, in FIG. 1A in particular the different panels, rows and sections are provided with reference lines and numbers, while in FIG. 1B in particular the different incisions and crease lines separating (i.e. defining the outer edges of) the panels are provided with reference lines and numbers. Dashed lines indicate crease lines, continuous lines between adjacent panels indicate incisions. Depending on the thickness of the cardboard used, it is apparent for an expert in the art that the incisions can in fact be cut-outs including punch-outs.

Figure 2:
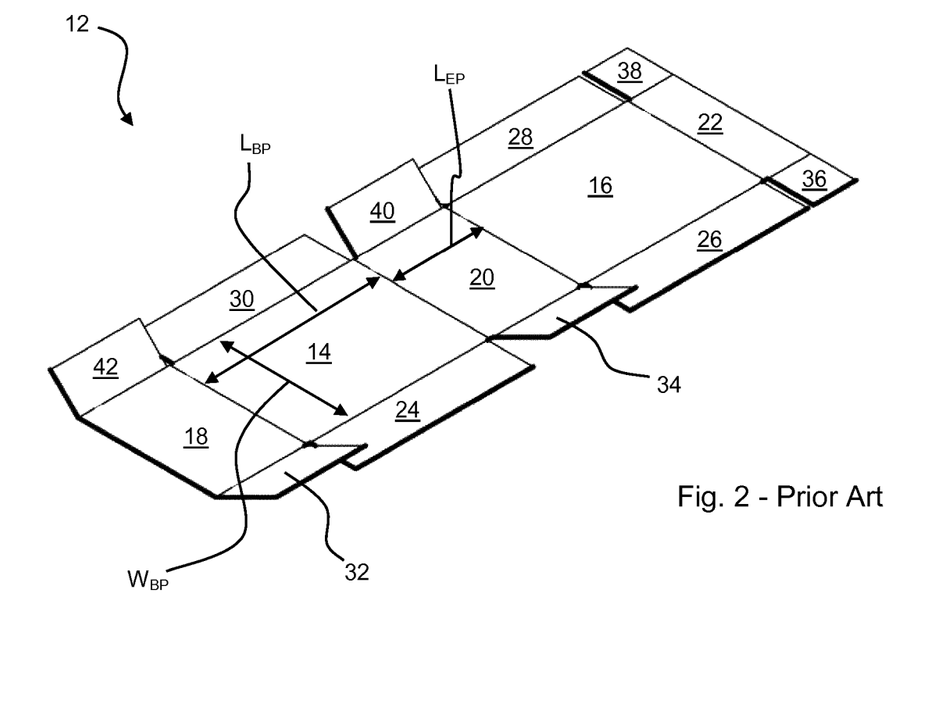
FIG. 2 is a perspective view of a custom-sized cardboard blank according to the prior art.

In order to better understand the advantages of the invention, FIG. 2 shows a custom-sized cardboard blank 12 according to the prior art having a so-called bottom panel 14, a top panel 16, a first end panel 18, a second end panel 20, a third end panel 22, side panels 24, 26, 28 and 30 and corner panels 32, 34, 36, 38, 40 and 42. While it is obvious that for a person viewing a closed box the terms "length", "width" and "height" depend on the respective perspective, from which the box is viewed, as used herein these terms relate to the following dimensions. The length of a box to be folded from blank 12 is determined by the length $L_{BP}$ of the bottom panel 14 (which corresponds to the length of the top panel 16 and the respective side panels 24, 26, 28 and 30). The width of the box is determined by the width $W_{BP}$ of the bottom panel 14 (which corresponds to the width of top panel 16 and the first, second and third end panels 18, 20, 22). The height of the box is determined by the length $L_{EP}$ of the second end panel 20 (which in this embodiment corresponds to the length of the first end panel 18).

In a system using a blank 12 as shown in FIG. 2, a shipment set comprised of one or more items is placed on the bottom panel 14, and the first end panel 18 and the second end panel 20, to which the top panel 16 and its adjacent panels is attached, are erected. The corner panels 32, 34, 40 and 42 are folded inwards, the side panels 24 and 30 are folded upwards, the top panel 16 is folded downwards onto the thus formed open box, the third end panel 22 is folded downwards, the corner panels 36 and 38 are folded inwards, and finally the side panels 26 and 28 are folded downwards. Some of the steps do not need to be performed in this order, but it is obvious that gripping and folding the panels is a complex operation. Due to multiple incisions separating certain panels, the panels can move rather freely and need to be gripped and guided in order to fold the box properly. In contrast to such blank, a custom-sized blank according to the invention comprises only two incisions.

Referring now to FIGS. 1A and 1B, a blank 10, of which according to the invention the dimensions of the respective panels have been custom-sized depending on the dimensions of a box to be created for a specific shipment set, comprises different rectangular and two pentagonal panels, which are—seen in the width direction W—arranged in three adjacent rows 44, 46 and 48 and which form—seen in the length direction L—five sections 50, 52, 54, 56 and 58.

Each panel 60, 62 and 64 in the first section 50, each panel 66, 68 and 70 in the third section 54 and the panel 72 in the fifth section 58 has a length that defines the height $H_B$ of the box in the folded state.

Each panel 74, 76 and 78 in the second section 52 and each panel 80, 82 and 84 in the fourth section 56 has a length that defines the length $L_B$ of the box in the folded state.

Each panel 62, 76, 68, 82 and 72 in the second row 46 has a width that defines the the width $W_B$ of the box in the folded state.

Each panel 60, 74, 66 and 80 in the first row 44 and each panel 64, 78, 70 and 84 in the third row 48 has width corresponding to height $H_B$ of the box in the folded state.

In the first row 44, panel 60 forms a first corner panel, panel 74 forms a first left side panel, panel 66 forms a first joint panel, and panel 80 forms a first right side panel. Note that while terms like "height", "width" and "length" and also the terms "left" and "right" depend of course on the perspective, as used herein the left side of the blank is defined as the side of the blank where corner panels are present.

In the second row 46, panel 62 forms a first top panel, panel 76 forms a left main panel, panel 68 forms a bottom panel, panel 82 forms a right main panel, and panel 72 forms a second top panel.

In the third row 48, panel 74 forms a second corner panel, panel 78 forms a second left side panel, panel 70 forms a second joint panel, and panel 84 forms a second right side panel.

The first and the second corner panels 60 respectively 64 are separated from the first top panel 62 via a respective incision 86 and 88. The first and the second corner panel 60 and 64 are separated from the first respectively the second left side panels 74 and 78 via a respective crease line 90 and 92.

The first top panel 62 is separated from the left main panel 76 via a crease line 94. The left main panel 76 is separated from the bottom panel 68 via a crease line 96. The bottom panel 68 is separated from the right main panel 82 via a crease line 98. The right main panel 82 is separated from the second top panel 72 via a crease line 100.

The first and the second left side panels 74 and 78 are separated from the left main panel 76 via a respective crease line 102 and 104. The first and the second left side panel 74 and 78 are separated from the first respectively the second joint panel 66 and 70 via a respective crease line 106, 108.

The first and the second joint panel 66 and 70 are separated from the first respectively the second right side panel 80 and 84 via a respective crease line 110, 112. The first and the second joint panel 66 and 70 are separated from the bottom panel 68 via a respective crease line 114 and 116.

The first joint panel 66 comprises three isosceles triangular sections 118, 120 and 122, which are defined by the crease lines 106, 110 and 114 between the respective adjacent side panels 74 and 80 respectively the bottom panel 68, a first diagonal crease line 124 running from the common corner of the first left side panel 74, the left main panel 76 and the bottom panel 68 in the direction of the diagonal opposed common corner of the joint panel 66 and the first right side panel 80, a second diagonal crease line 126 running from the common corner of the first right side panel 80, the right main panel 82 and the bottom panel 68 in the direction of the diagonal opposed common corner of the first left side panel 74 and the first joint panel 66. In other words, the joint panel 66 is divided by crease lines 124, 126 between diagonally opposed corners of the joint panel 66, wherein the "outer triangle" of the joint panel has been cut away, i.e. the extensions of the crease lines 124 and 126 from the point, where these lines meet, are cut lines defining outer edges of the blank 10. Similarly, the second joint panel 70 is divided by third and fourth diagonal crease lines 128 and 130 and the respective crease lines 108, 112 and 116 into three isosceles triangular sections 132, 134 and 136, the outer triangle again being cut away.

The first and the second right side panels 80 and 84 are separated from the right main panel 82 via a respective crease line 138, 140. The crease lines 138, 114 and 102 form, like the crease lines 140, 116 and 104 do, one continuous crease line, which makes indenting the blank to form the crease lines easy. Depending on the thickness of the cardboard used, it is apparent for an expert in the art that the incisions 86 and 88 can in fact be cut-outs and that the crease lines 110, 98 and 112, the crease lines 106, 96 and 108, and the crease lines 90, 94 and 92 can be slightly offset with respect to each other in order to take into account the thickness of the material used. However, for thin material and in particular for single-faced corrugated cardboard, it has turned out that such offset is not necessary and that accordingly the crease lines 110, 98 and 112, the crease lines 106, 96 and 108, and the crease lines 90, 94 and 92 also form continuous crease lines, which further reduces the effort that has to be made upon creating a respective blank.

Within the boundaries imposed by the material used, the panels can be custom-sized depending on the dimensions the box to be folded needs to have. These dimensions can be determined in different ways known per se, for example by scanning the maximum outer dimensions of a shipment set, i.e. of one item or an arrangement of several items to be shipped, with a laser scanner or other suitable structure for obtaining dimensions. The dimensions may also be obtained from a database containing information on the items, and it may also be foreseen that a corresponding control unit calculates based on information about the dimensions of items forming a shipment set a virtual arrangement of the items that is optimal with respect to certain optimization criteria such as volume of the box, and that this virtual arrangement is displayed to a person packaging the items in a box or is used for controlling mechanics automatically arranging the items in a box.

Once the dimensions width, height and length of a box needed for packaging a specific shipment set are obtained, the dimensions of the panels of the blank 10 can easily be calculated. The blank 10 is then cut and creased, which can be done manually, but which preferably is done fully automatically. Likewise, erecting the panels as will be described later can be done manually or automatically. A respective system for cutting and creasing the cardboard to create the blank and for folding the blanks to form the box wanted comprises structure for cutting (which may also include die cutting), like rotating or reciprocating knives, lasers, die cutters etc., structure for creasing, like crease rollers, moving stamps etc. and structure for folding the cardboard like moveable grippers and flaps and preferable also structure for attaching an adhesive tape or an adhesive sticker to close the box, or a gluing unit, which applies some hot-melt glue between the top panels to close the box.

Figure 3:
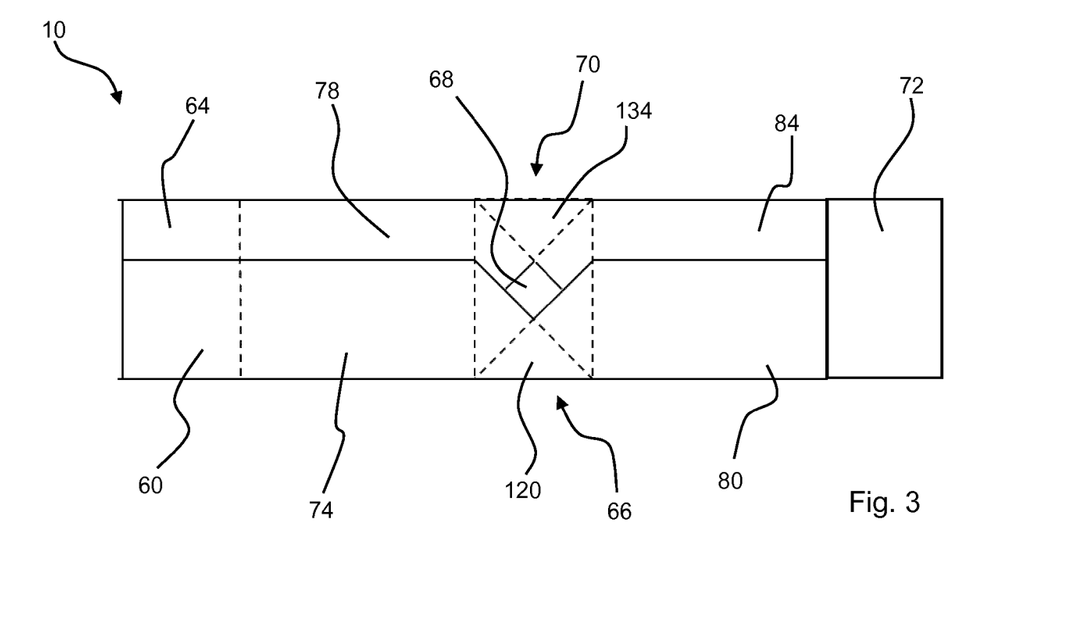
FIG. 3 shows one step of folding a box from the blank shown in FIG. 1.

The structure for folding can be kept very simple, as, once the blank 10 is folded in a specific way, the box is almost "self-erecting". A first step of folding a box from the blank 10 is shown in FIG. 3. The panels 64, 78, 70 and 84 of the third row (48 in FIG. 1A) are folded along the crease lines 104, 116 and 140 respectively along the incision 88, onto the panels of the second row (46 in FIG. 1A). The panels 60, 74, 66 and 80 of the first row (44 in FIG. 1A) are folded along the crease lines 102, 114 and 138 respectively along the incision 86 onto the panels of the second row. As in the shown embodiment, the width $H_B$ of the side panels is more than half of the width of the main panels, the panels of the first row slightly overlap the panels of the third row.

Figure 4:
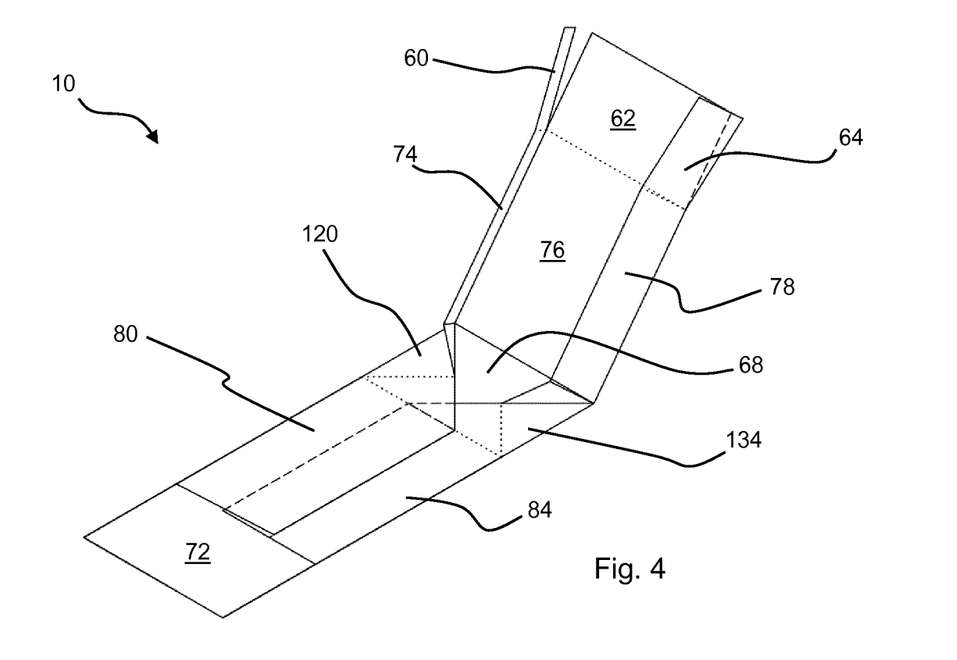
FIG. 4 shows a step of folding the box following the step shown in FIG. 3.

In this situation, the triangular sections 120 and 134 of the joint panels 66 and 70 are fixed, i.e. kept in place for example by holding them down manually or, preferably, by a flat, for example triangular shaped, blade or flap. Next, if the panels in the fourth and the fifth section (56 and 58 in FIG. 1A) are released and the remaining panels are kept down, or if—as shown in FIG. 4—the panels in the first and second section (50 and 52 in FIG. 1A) are released and the other panels are kept down, due to the nature of the material, the triangular sections 120 and 134 kept in place and the presence of the triangular sections 122 and 136, connected with crease lines to the respective triangular sections 120 and 134 and the respective first and second right side panels 80 and 84, the released panels will almost automatically come in a position like the one shown in FIG. 4. In the shown example, in particular the first and the second left side panels 74 and 78 tend to unfold, i.e. move away from the left main panel 76. Due to the special shape of the joint panels and their respective crease lines, the force exerted by moving the left main panel 76 upwards will move the first and second left side panels 74 and 78 outwards from the left main panel 76. Of course, this movement can be supported manually or automatically with rather simple mechanics, as it is not necessary to grip the panels. It is sufficient to give for example the left main panel 76 a little push upwards.

Figure 5:
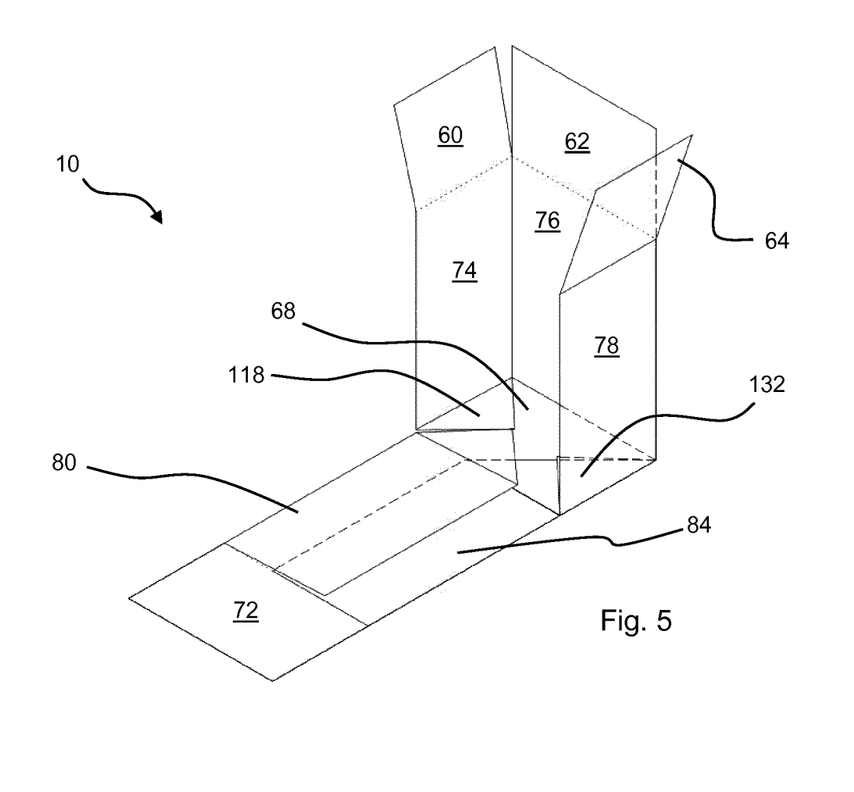
FIG. 5 shows a step of folding the box following the step shown in FIG. 4.

FIG. 5 shows a situation, in which the left main panel 76 has been fully erected. The triangular sections 120 and 134

(FIG. 4) of the joint panels are still kept in place while the triangular sections 118 and 132 have folded onto them, and the respective crease lines in the joint panels lead to an "automatic" positioning of the left side panels 74 and 78.

Figure 6:
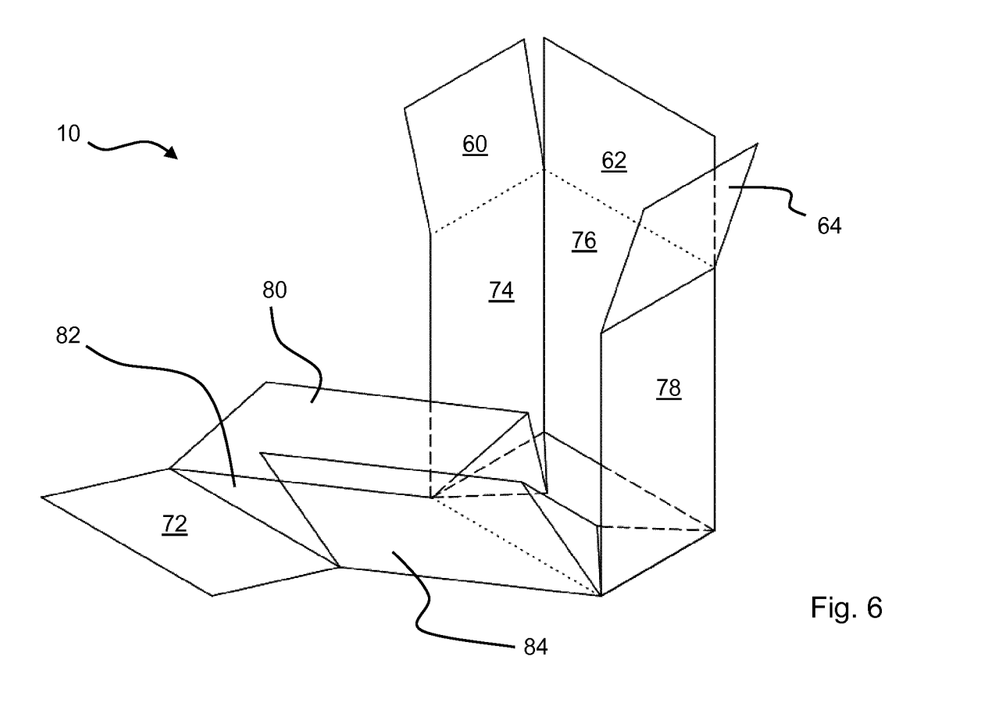
FIG. 6 shows a step of folding the box following the step shown in FIG. 5.

FIG. 6 shows a situation, in which right side panels are released while still holding the triangular sections 120 and 134 (FIG. 4) in place. Similarly to the first and second left side panels 74 and 78, once released the first and second right side panels 80 and 84 tend to move away from the right main panel 82. If the right main panel 82 is then moved upwards, the first and second right side panels 80 and 84 will automatically unfold in the box, as the triangular sections 118 and 132 in the respective joint panels 66 and 70 work as a kind of guiding hinges allowing only this movement of the right side panels. As the left side panels in the box are in parallel planes to the respective right side panels, the sides of the box are two-ply and hence give the whole box more stability, advantageously allowing the use of materials such as single-faced corrugated although such material generally has a high flexibility.

Figure 7:
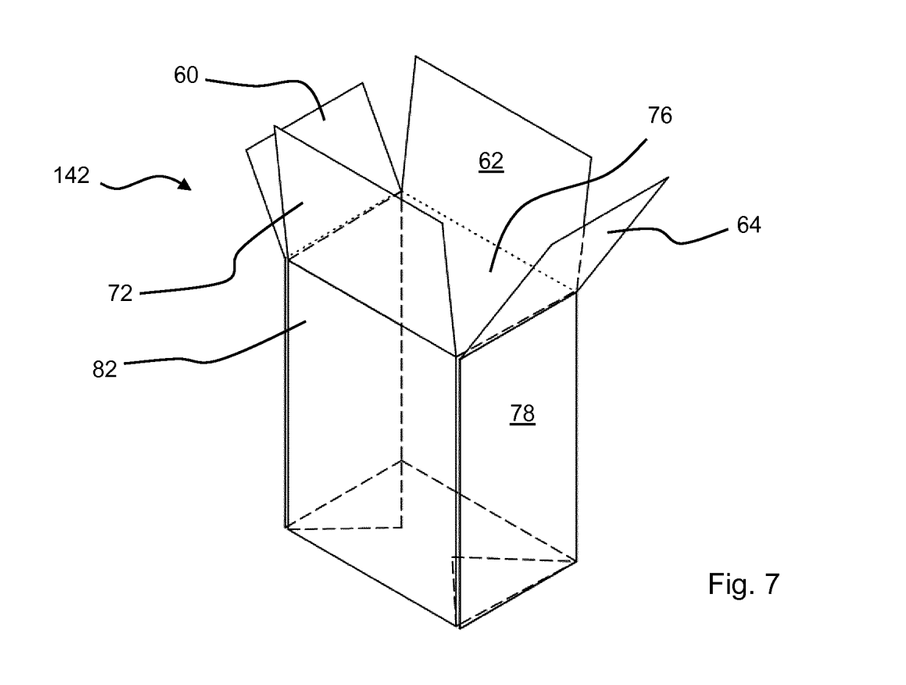
FIG. 7 shows the box in the folded, but not yet filled and closed state.

FIG. 7 shows a box 142 in the fully erected but not yet closed state. This box can now be filled manually or automatically, for example by laying the box onto the left or the right main panel 76 and 82 and pushing items from a so called "tote" (a device for assembling items for shipment comprising movable panels) as described in EP 3 284 686 A1 into the box. By folding the corner panels 60 and 64 and the first and the second top panels 62 and 72 inwards, the box can be closed and easily be fixed in this closed state for example by applying some hot-melt glue between the first and the second top panels or by attaching a strip of adhesive tape fixing the first or the second top panel 62 and 72 (whichever forms the outer panel—the first top panel 62 may be folded inwards before the second top panel 72 or vice versa) to that main panel 76 or 82, to which it is not linked via a crease line joined, and/or by fixing the respective top panel to the first and second left side panels 74 and 78.

Figure 8:
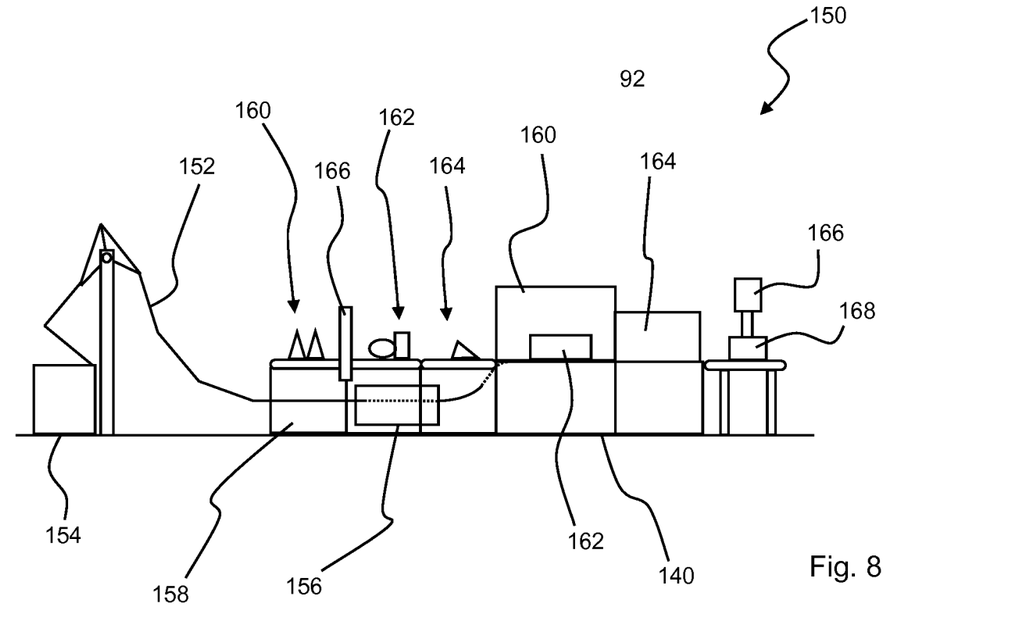
FIG. 8 shows very schematically a system for packaging shipment sets in boxes.

A respective system 150 for packaging shipment sets of items varying in size and number is very schematically shown in FIG. 8. In this example, cardboard 152 is supplied from a stack 154 of zig-zag folded cardboard to a station 156 for cutting the cardboard and introducing crease lines to delimit the respective panels from each other and to thus produce a custom-sized blank according to the invention for a box. The respective dimensions of the panels are calculated based on information on the items in a shipment set. The system may comprise a calculating unit, which can be part of a control unit for controlling the complete system and which may for example be integrated in a receiving unit 158, where sets of one or more items like the sets 160, 162 and 164, which shall be packaged, are placed either automatically or manually. The sets to be packaged are transported via conveyor belts through a laser scanning unit 166, which measures the outer dimensions of the sets passing through the unit in order to obtain information on the necessary dimensions length, width and height a box needs to have in order to accommodate the respective set. Of course, the system could also be provided with structure for arranging the items in a certain manner. However, in this schematic drawing a simple and fast working embodiment is shown. The cardboard blank is transported from the cutting and creasing station 156 to a folding station 160, where a box is erected as described above and laid on the left or right main panel with the open side facing the set to be packaged. A guiding and pushing unit 162 then pushes the set into the respective box. In a closing station 164, the box is closed as described above. The closed boxes are then transported via respective conveyor belts to a label printing and application unit 166, which puts a label including for example the address of the recipient and postage on the boxes such as box 168, which then can be picked up and further transported.

Within the scope of the inventive idea, multiple variations are possible, which relate for example to the order, in which the panels are erected and folded. Also, it is possible to provide corner panels at both, the so-called left and the so-called right sides of the blank, so that the fifth section would not only comprise a top panel but also two corner panels.

In a specific embodiment the dimensions width, height and length may be interchanged to optimize the amount of cardboard needed to create the blank 10 and to reduce the amount of waste cardboard created. For example in a configuration that uses an endless feed of cardboard like for example the zig-zag folded stack 154 in FIG. 8 it might be preferred to optimize the width of the blank 10 to be close to the available width of the cardboard 152, which will minimize the amount of waste produced.

The invention claimed is:

1. A cardboard blank for folding a box, said blank comprising incisions and crease lines dividing the blank having a length and a width into three adjacent rows of panels, namely a first row consisting of a first corner panel, a first left side panel, a first joint panel, and a first right side panel, a second row adjacent to the first row, comprising a first top panel, a left main panel, a bottom panel, a right main panel and a second top panel, and a third row adjacent to the second row, the third row consisting of a second corner panel, a second left side panel, a second joint panel and a second right side panel, the first and the second corner panel being separated respectively from the first and the second left side panel via a respective crease line, the first and the second left side panel being separated respectively from the first and the second joint panels via a respective crease line, the first and the second joint panel being separated respectively from the first and the second right side panels via a respective crease line, the first top panel being separated from the left main panel, the left main panel being separated from the bottom panel, the bottom panel being separated from the right main panel and the right main panel being separated from the second top panel via a respective crease line, the first and the second left side panel being separated from the left main panel via a respective crease line, the first and the second right side panel being separated from the right main panel via a respective crease line, the first and the second joint panel being separated from the bottom panel via a respective crease line, the first and the second corner panels being separated from the first top panel via a respective incision, the first joint panel comprising three triangular sections defined by the crease lines between the respective side panels adjacent to the first joint panel, the crease line between the bottom panel and the first joint panel, a first diagonal crease line running from a common corner of the first left side panel, the left main panel and the bottom panel in the direction of the diagonally opposed common corner of first right side panel and the first joint panel, a second diagonal crease line running from a common corner of the first right side panel, the right main panel and the bottom panel in the direction of the diagonally opposed common corner of the first left side panel and the first joint panel, and two free edges running from a point where the first and the second diagonal crease lines meet towards the common corner of the first left side panel and the first joint panel respectively towards the common corner of the first right side panel and the first joint panel, the second joint panel comprising three triangular sections defined by the crease lines between the respective side panels adjacent to the second joint panel, the crease line between the bottom panel and the second joint panel, a third diagonal crease line running from a common corner of the second left side panel, the left main panel and the bottom panel in the direction of the diagonally opposed common corner of second right side panel and the second joint panel, a fourth diagonal crease line running from a common corner of the second right side panel, the right main panel and the bottom panel in the direction of the diagonally opposed common corner of the second left side panel and the second joint panel, and two free edges running from a point where the third and the fourth diagonal crease lines meet towards the common corner of the second left side panel and the second joint panel respectively towards the common corner of the second right side panel and the second joint panel.

2. The cardboard blank according to claim 1, said blank comprising incisions and crease lines dividing the blank into the panels, wherein in the length direction four or five adjacent sections of panels are present, each panel of the first, third and fifth section of the second row and each panel of the first and third fifth section of the first and third rows having a length corresponding to a height of the box to be folded, and each panel of the second and forth section of the first, second and third rows having a length corresponding to a length of the box to be folded, in the width direction three adjacent rows of panels are present, each panel of the second row having a width corresponding to a width of the box to be folded, and each panel of the first and the third row having a width corresponding to the height of the box to be folded, between adjacent panels in the length direction crease lines are provided, between panels of the second, the third and the forth section, which are adjacent to each other in the width direction, crease lines are provided, adjacent panels of the first section are separated from each other by incisions, in the fifth section only a panel in the second row is present, between the panels of the second and the forth section in the first and the third row, a respective joint panel is provided, each of which is being divided in triangular sections by crease lines between diagonally opposing corners of each joint panel, the outer triangle being cut away.

3. The cardboard blank according to claim 2, characterized in that said blank is made from plain cardboard, single faced corrugated cardboard or double faced corrugated cardboard.

4. The cardboard blank according to one of claim 2 characterized in that the crease lines between the panels of two adjacent rows form a continuous crease line.

5. The cardboard blank according to one of claim 2 characterized in that the crease line between two panels in the same row forms a continuous crease line with the crease line between two panels of an adjacent row.

6. The cardboard blank according to claim 1, wherein said blank is made from plain cardboard, single faced corrugated cardboard or double faced corrugated cardboard.

7. The cardboard blank according to claim 1, wherein the crease lines between the panels of two adjacent rows form a continuous crease line.

8. The cardboard blank according to claim 1, wherein the crease line between two panels in the same row forms a continuous crease line with the crease line between two panels of an adjacent row.

9. A method, comprising:
obtaining the dimensions width, height and length of a box needed for packaging a specific shipment set of one or more items,
calculating the dimensions of the panels of a cardboard blank based on the obtained dimension,
cutting and creasing based on said calculated dimensions from a piece of cardboard a blank according to claim 1 to create a custom-sized cardboard blank for the box needed for packaging a specific shipment set of one or more items.

10. The method according to claim 9, further comprising:
rearranging the dimensions length, width and height such that the minimum amount of cardboard is needed to create the cardboard blank.

11. The method of claim 9, further comprising:
folding the panels of the first or the third row inwards onto the panels of the second row,
folding the panels of the third or the first row inwards onto the panels of the second row,
fixing the triangular sections of the joint panels having a common side with the bottom panel,
forming an open box by erecting
either first the right side and main panels including the second top panel respectively the panels in the fourth and the fifth section and then erecting the left side and main panels including the first top panel and the corner panels respectively the panels in the first and second section,
or first the left side and main panels including the first top panel and the corner panels respectively the panels in the first and second section and then erecting the right side and main panels including the second top panel respectively the panels in the fourth and the fifth section,
placing the shipment set in the box, and
closing the box.

12. A system, comprising structure for:
obtaining the dimensions width, height and length of a box needed for packaging a specific shipment set of one or more items,
calculating the dimensions of a plurality of panels of a cardboard blank based on the obtained dimension,
cutting and creasing based on said calculated dimensions from a piece of cardboard a blank according to claim 1 to create a custom-sized cardboard blank for a box.

13. The system of claim 12, further comprising:
structure for folding the panels of the first or the third row inwards onto the panels of the second row,
structure for folding the panels of the third or the first row inwards onto the panels of the second row,
structure for fixing the triangular sections of the joint panels having a common side with the bottom panel, structure for forming an open box by erecting
either first the right side and main panels including the second top panel respectively the panels in the fourth and the fifth section and then releasing and erecting the left side and main panels including the first top panel and the corner panels respectively the panels in the first and second section,
or first the left side and main panels including the first top panel and the corner panels respectively the panels in the first and second section and then erecting the right side and main panels including the second top panel respectively the panels in the fourth and the fifth section,
structure for closing the box.

14. The system according to claim 13, further comprising: structure for placing the shipment set in the box.

15. The cardboard blank for folding a box of claim 1 wherein the only diagonal crease lines in the first row are the first diagonal crease line running from the common corner of the first left side panel, the left main panel and the bottom panel in the direction of the diagonally opposed common corner of first right side panel and the first joint panel, and the second diagonal crease line running from the common corner of the first right side panel, the right main panel and the bottom panel in the direction of the diagonally opposed common corner of the first left side panel and the first joint panel, and wherein the only diagonal crease lines in the third row are the third diagonal crease line running from the common corner of the second left side panel, the left main panel and the bottom panel in the direction of the diagonally opposed common corner of second right side panel and the second joint panel, and the fourth diagonal crease line running from the common corner of the second right side panel, the right main panel and the bottom panel in the direction of the diagonally opposed common corner of the second left side panel and the second joint panel.

16. The cardboard blank according to claim 1, wherein the only diagonal crease lines in the first and the third row are the crease lines between diagonally opposing corners of each joint panel.

* * * * *